US006054223A

United States Patent [19]

Tsuchiya et al.

[11] Patent Number: 6,054,223

[45] Date of Patent: Apr. 25, 2000

[54] INK-JET RECORDING SHEET

[75] Inventors: Ichiro Tsuchiya; Hiroyuki Uemura, both of Hino, Japan

[73] Assignee: Konica Corporation, Japan

[21] Appl. No.: 08/929,647

[22] Filed: Sep. 15, 1997

[30] Foreign Application Priority Data

Sep. 19, 1996 [JP] Japan .................................... 8-247734

[51] Int. Cl.[7] ........................................................ B32B 9/02

[52] U.S. Cl. ................... 428/478.2; 428/195; 428/411.1; 428/480; 428/500; 428/516; 428/522; 428/530

[58] Field of Search .................................... 428/195, 211, 428/323, 328, 329, 418.2, 478.4, 473, 478.8, 478.2, 480, 511, 516, 500, 530, 411.1, 522; 347/105

[56] References Cited

U.S. PATENT DOCUMENTS

| | | | |
|---|---|---|---|
| 4,371,582 | 2/1983 | Sugiyama et al. | 428/341 |
| 5,677,067 | 10/1997 | Kojima et al. | 428/478.2 |
| 5,738,932 | 4/1998 | Kondo et al. | 428/195 |

FOREIGN PATENT DOCUMENTS

| | | |
|---|---|---|
| 0164196 | 11/1985 | European Pat. Off. . |
| 0184797 | 6/1986 | European Pat. Off. . |

OTHER PUBLICATIONS

European Search Report EP 97 30 7259 Publication # 01146784, Publication Date Aug. 6, 1989.

*Primary Examiner*—William Krynski
*Assistant Examiner*—Michael E. Grendzynski
*Attorney, Agent, or Firm*—Jordan B. Bierman; Bierman, Muserlian and Lucas

[57] ABSTRACT

An ink-jet recording sheet is disclosed, comprising a support having on at least one side thereof an ink receiving layer, wherein the ink receiving layer comprises a gelatin having an isoelectric point of 5.5 to 9.6 and a water-soluble cationic polymer.

15 Claims, No Drawings

INK-JET RECORDING SHEET

FIELD OF THE INVENTION

The present invention relates to a sheet for ink-jet recording by use of a water-based ink and in particular to an ink-jet recording sheet which is superior in water resistance after printing, while exhibiting superior image sharpness and uniformity.

BACKGROUND OF THE INVENTION

Ink-jet recording apparatuses (hereinafter, also referred to as ink-jet printers) are usually low in noise, enable high-speed printing and facilitate multi-color recording by use of plural ink nozzles, so that they are broadly employed as an image information outputs unit of computers. Further, the use thereof has spread to color reproofs and designed images.

As an ink for use in ink-jet printers is generally employed a water-based ink mainly comprised of water and aqueous-soluble organic solvent to prevent ink clogging of nozzles and improve discharge property. As a recording sheet are employed conventional paper and a so-called ink-jet recording sheet comprising a support and provided thereon a porous ink absorbing layer. However, these recording sheets result in marked ink blurrings and low glossiness, which do not meet recent requirements for high image quality. In cases where a conventional porous ink absorption layer is provided on a film or glossy resin-coated paper, the porous ink absorption layer has a rough surface to produce irregular reflection, resulting in disadvantages such that transparency or glossiness is lost. In the case of a non-porous ink absorption layer, light transmission is improved but ink absorptivity deteriorates, producing problems such that after image printing, ink remains on the surface for a long time and the dry-fixing time becomes longer.

To solve the above problems, gelatin can be employed as an ink absorption layer exhibiting high light transmissivity and superior water-based ink absorptivity. There are proposed a absorption layer formed with an aqueous gelatin solution with a specified pH value, as described in JP-A 62-263084 (herein, the term, "JP-A" means an unexamined and published Japanese Patent Application), the use of a mixture of gelatin and surfactant, as described in JP-A 1-146784, and a recording sheet obtained by gelating coated gelatin and drying by a cold-drying method, as described in JP-A 6-64306. Although the ink receiving layer employing gelatin is superior in ink absorptivity and glossiness, it is inferior in ink fixability, having the disadvantage that dyes contained in the ink leach out when wetted with water.

There is reported a technique of using a water-soluble cationic polymer for the purpose of enhancing water resistance of prints, as described in JP-a 61-61887 and 61-63477. From the inventors' study, however, it was proved that even if this water-soluble polymer is applied to the gelatin ink absorption layer, sufficient water resistance can not be achieved and print quality is still deteriorated.

SUMMARY OF THE INVENTION

Accordingly, it is an objective of the present invention to provide an ink-jet recording sheet which is superior in water resistance of a print, glossy and high quality.

It is another objective of the invention to provide an ink-jet recording sheet having an ink receiving layer superior in image sharpness and uniformity.

As a result of the inventors' study, it was proved that the above objectives were achieved by the use of a combination of a specific gelatin and cationic polymer.

Thus, the objectives can be accomplished by the following constitutions.

(1) An ink-jet recording sheet comprising a support having on at least one side thereof at least one ink receiving layer, wherein the ink receiving layer comprises a gelatin having an isoelectric point of 5.5 to 9.6 and a water-soluble cationic polymer.

(2) The ink-jet recording sheet described in (1), wherein the isoelectric point of the gelatin is 8.0 to 9.5.

(3) The ink-jet recording sheet described in (1) or (2), wherein the water-soluble cationic polymer is selected from the group consisting of a polymer containing a polymerization unit comprised of a monomer represented by the following formula (1), (2), (3) or (K), a polyallylamine, a dicyandiamide condensate, a polyethyleneimine, a cation modified PVA, a cation modified PVP, an epichlorohydrin derivative and an amino group substituted nylon.

Formula (1)

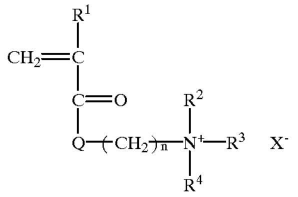

wherein $R^1$ represents a hydrogen atom or a methyl group; Q represents an oxygen atom or —NH—; $R^2$, $R^3$ and $R^4$ each represent a hydrogen atom, methyl group or ethyl group, provided that all of $R^2$, $R^3$ and $R^4$ are not hydrogen atoms at the same time; n is an integer of 1, 2 or 3; and $X^-$ represents an anion;

Formula (2)

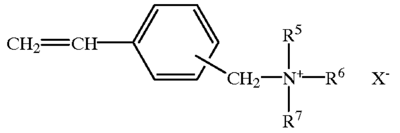

wherein $R^5$, $R^6$ and $R^7$ each represent a methyl group or ethyl group; and $X^-$ represents an anion;

Formula (3)

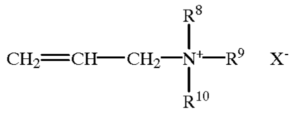

In the formula, $R^8$, $R^9$ and $R^{10}$ each represent a methyl group or ethyl group; and $X^-$ represents an anion;

Formula (K)

(HX)

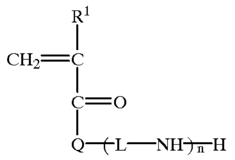

wherein $R^1$ represents a hydrogen atom or a methyl group; Q represents an oxygen atom or —NH—; L represents a bivalent linkage (preferably, an alkylene group and more preferably a methlene group); $X^-$ represents an anion and forms an acid with H; n is an integer of 1 to 100.

(4) The ink-jet recording sheet described in (1), (2) or (3), wherein the water-soluble cationic polymer is selected from the group consisting of a polymer containing a polymerization unit comprised of a monomer represented by formula (K), a polyallylamine, a dicyandiamide condensate, a cation modified PVP and an epichlorohydrin derivative.

(5) The ink-jet recording sheet described in any of (1) through (4), wherein a ratio of a content of the gelatin (G) to that of the water-soluble cationic polymer (C) by weight meets the following requirement:

$$20/80 \leqq G/C \leqq 95/5.$$

(6) The ink-jet recording sheet described in any of (1) through (5), wherein a ratio of a content of the gelatin (G) to that of the water-soluble cationic polymer (C) by weight meets the following requirement:

$$40/60 \leqq G/C \leqq 90/10.$$

(7) The ink-jet recording sheet described in any of (1) through (6), wherein the ink receiving layer contains at least one of gelatin, the water-soluble cationic polymer and an aqueous-soluble polymer.

(8) The ink-jet recording sheet described in (7), wherein the aqueous-soluble polymer is one selected from the group consisting of polyvinyl pyrrolidones and polyvinyl alcohols and polyethylene glycols.

(9) The ink-jet recording sheet described (7) or (8), wherein the aqueous-soluble polymer is contained in an amount of 10 to 70% by weight of the ink receptive layer.

(10) The ink-jet recording sheet described in any of (7) through (9), wherein the aqueous-soluble polymer is contained in an amount of 20 to 60% by weight of the ink receptive layer.

(11) The ink-jet recording sheet described in any of (1) through (10), wherein the support is a hydrophobic substrate.

(12) The ink-jet recording sheet described in any of (1) through (11), wherein the hydrophobic substrate is a resin coated paper in which both sides of paper are coated with a resin.

(13) The ink-jet recording sheet described in any of (10) through (12), wherein the resin is a polyolefin resin.

(14) The ink-jet recording sheet described in any of (10) through (13), wherein the polyolefin resin is a polyethylene resin.

(15) The ink-jet recording sheet described in (11), wherein the hydrophobic substrate is a polyester resin film.

(16) The ink-jet recording sheet described in (15), wherein the transparent resin film is a polyethylene terephthalate film.

The present invention will be further explained in detail.

One feature of the invention is that the gelatin has an isoelectric point of 5.5 to 9.6. Such a gelatin which is different from lime-processed gelatin conventionally employed in silver halide photography, is obtained from collagen made of pig skin or cow bone through a manufacturing process subjected to treatment with an acid such as hydrochloric acid. Details thereof are described in "The Macromolecular Chemistry of gelatin" (published by Academic Press). The isoelectric point of gelatin can be measured using a pH meter and is preferably within the range of 8.0 to 9.5.

The jelly strength of gelatin relating to the invention, which can be measured by a bloom gelometer according to PAGE method, is not less than 150 g and preferably 200 to 300 g.

In the ink-jet recording sheet according to the invention, the ink receiving layerwhich is provided in a support or on the support, contains a gelatin and a water-soluble cationic polymer. The water-soluble cationic polymer according to the invention refers to a polymer, in which a polymer moiety exhibits cationic property in an aqueous solution. Exemplary examples thereof are polymers containing a primary, secondary or tertiary amino group or a quaternary ammonium salt. Any of such water-soluble cationic polymers can be employed and there is no limitation with respect to the kind thereof.

Examples of the cationic polymers preferably employed in the invention are as follows.

a) Polyallylamines b) Dicyandiamide condensates c) Polyethyleneimines d) Cation modified PVA e) Cation modified PVP f) Epichlorohydrin derivatives g) Amino substituted nylon i) Polymer containing a polymerization unit comprised of a monomer represented by afore-mentioned formula (1)

j) Polymer containing a polymerization unit comprised of a monomer represented by afore-mentioned formula (2)

k) Polymer containing a polymerization unit comprised of a monomer represented by afore-mentioned formula (3)

1) Polymer containing a polymerization unit comprised of a monomer represented by afore-mentioned formula (K)

The polyallylamines include a polyallylamine represented by formula (4), a polydiallylamine represented by formula (5-1), (5-2) and a polydiallylamine derivative represented by formula (6-1) or (6-2) or a polymer thereof.

Formula (4)

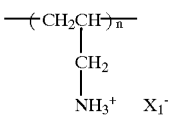

In formula (4), n is an integer of 5 to 10,000; and $X^-$ represents a residue of an inorganic acid or organic acid.

Formula (5–1)

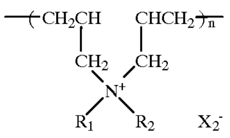

Formula (5–2)

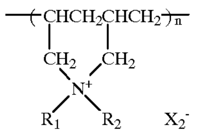

-continued

Formula (6–1)

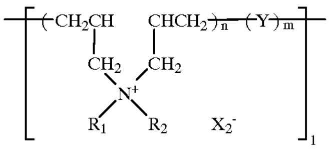

Formula (6–2)

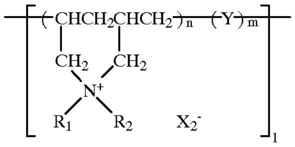

In formulas (5-1), (5-2), (6-1) and (6-2), $R_1$ and $R_2$ each represent a hydrogen atom, methyl group, ethyl group or hydroxyethyl group; $X_2^-$ represents an inorganic acid residue or organic acid residue; Y represents a bivalent linkage group; n/m=9/1 to 2/8 and 1=5 to 10,000.

Exemplary examples of the polydiallylamine derivatives include those which contain a repeating unit having a $SO_2$ group represented by a general formula described in JP-A 60-83882, copolymers with an acrylamide described in JP-A 1-9776 at page 2 and copolymers with a polydiallylamine represented by formula (6-1) or (6-2).

Examples of the dicyandiamide condensates include a dicyandiamine Formalin condensate and polyalkylene-polyamine-dicyandiamide ammonium salt condensate. These are commercially available, as trade names of SANFIX 70 of Sanyo Kasei Co. Ltd., NICAFLOC D-1000 of Nihon Carbide Co. Ltd., NEOFIX F and NEOFIX RP-70Y of Nikka Kagaku Co. Ltd.

The polyethyleneimine refers to a polymer obtained by polymerizing an ethyleneimine or a derivative thereof, and preferably a polyethyleneimine quaternary ammonium salt compound. As examples thereof are compounds represented by formula (1) described in JP-A 60-72785 at pages 2–3 and 60-138280 at page 3.

The cation modified PVA (polyvinyl alcohol) refers to a copolymer of a vinyl alcohol and a monomer containing a cationic group, and examples thereof are described in JP-A 62-138280.

The cation modified PVP (polyvinyl pyrrolidone) refers to a copolymer of vinyl pyrrolidone and a monomer containing a cationic group. Examples of the monomer containing a cationic group include a vinylimidazole in a quaternary salt form, dialkylaminoethylmethacrylate in a quaternary salt form and methacrylamidotrialkylammonium.

Examples of the epichlorohydrin derivatives polyamide-epichlorohydrin resin, a reaction product of epichlorohydrin and a tertiary amine as described in JP-A 61-252189 at page 2 and a compound represented by formula (II) described in JP-A 62-259882 at page 4. These compounds can be synthesized by known methods, and are also commercially available, as Nalpory 607 (product by Nalco Chemical Co.) and Polyfix 250WS (product by Showa Kobunshi Co. Ltd.).

Examples of the amino group substituted nylon are described in JP-A 59-33179 at page 2 and it is commercially available as AQ Nylon (trade name: Product by Toray Co. Ltd.).

Of monomers represented formula (1), examples of preferred compounds include quaternary salts of methylchloride, ethylchloride, methylbromide, ethylbromide, methyliodide ethyliodide of N,N-dimethylaminoethyl(metha)acrylate, N,N-diethylaminoethyl(metha)acrylate, N,N-dimethylaminopropyl(metha)acrylate, N,N-diethylaminoethyl(metha) acrylamide, N,N-dimethylaminopropyl(metha)acrylamide, N,N-diethylamino-propyl(metha)acrylamide, or their anionic salts such as a sulfonate, alkylsulfonate, acetate and alkylcarboxylate. Of these, examples of preferred compounds include trimethyl-2-(methacryloyloxy) ethylammonium chloride, triethyl-2-(methacryloyloxy) ethylammonium chloride, trimethyl-2-(acryloyloxy) ehtylammonium chloride, triethyl-2-(acryloyloxy) ethylammonium chloride, trimethyl-3-(methacryloyloxy) propylammonium chloride, triethyl-3-(methacryloyloxy) propylammonium chloride, trimethyl-2-(methacryloylamino)ethylammonium chloride, triethyl-2-(methacryloylamino)ethylammonium chloride, trimethyl-2-(acryloylamino)ethylammonium chloride, triethyl-2-(acryloylamino)ethylammonium chloride, trimethyl-3-(acryloylamino)propylammonium chloride, triethyl-3-(acryloylamino)propylammonium chloride, N,N-dimethyl-N-methyl-2-(methacryloyloxy)ethylammonium chloride, N,N-dimethyl-N-methyl-2-(methacryloyloxy) propylammonium chloride, trimethyl-2-(methacryloyloxy) ethylammonium chloride, trimethyl-3-(acryloylamino) propylammonium bromide, trimethyl-2-(methacryloyloxy) ethylammonium sulfonate and trimethyl-3-(acryloylamino) propylammonium acetate.

Preferred examples of the monomer represented by formula (2) include trimethyl-p-vinylbenzylammonium chloride, trimethyl-m-vinylbenzylammonium chloride, triethyl-p-vinylbenzylammonium chloride, triethyl-m-vinylbenzylammonium chloride, N,N-dimethyl-N-ethyl-p-vinylbenzylammonium chloride, N,N-diethyl-N-methyl-p-vinylbenzylammonium chloride, trimethyl-p-vinylbenzylammonium bromide, trimethyl-m-vinylbenzylammonium bromide, trimethyl-p-vinylbenzylammonium sulfonate, trimethyl-m-vinylbenzylammonium sulfonate, trimethyl-p-vinylbenzylammonium acetate, and trimethyl-m-vinylbenzylammonium sulfonate.

Preferred examples of the monomer represented by formula (3) include diallyldimethylammonium chloride, diallyldiethylammonium chloride, diallyldimethylammonium bromide, diallyldimethylammonium sulfonate, and diallyldimethylammonium acetate.

Further, by allowing this monomer to copolymerize with a monomer selected from the group of acryl amide, methacrylamide, N,N-dimethylacrylamide, N-isopropylacrylamide, diacetoneacrylamide, N-methylolacylamide, 2-hydroxyethyl(metha)acrylate, 2-hydroxypropyl(metha)acrylate and N-vinylpyrrolidone, within a range of 20 to 80 parts by weight, it is possible to provide preferable characteristics such that an ink absorbing capacity and ink absorbing speed of the polymer containing tertiary ammonium group are enhance, the ink-dot diameter is optimally adjusted and non-uniformity of a solid density portion is modified.

Of these cationic polymers are particularly preferred polyallylamines, dicyandiamide condensate, cation modified PVP, epichlorohydrin derivatives and polymers containing a polymerization unit formed from the monomer represented by formulas (1), (2), (3) and (K). Of these, the polymer containing a polymerization unit comprised from the monomer represented by formula (K) is preferred in terms of compatibility with gelatin. There is also preferable a polymer containing, in addition to the monomer represented by formula (K), a polymerization unit comprised of the monomer represented by the following formula (L) and/or a monomer represented by formula (M).

Formula (L)

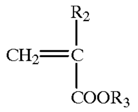

Formula (M)

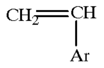

In the formula, $R_2$ represents a hydrogen atom or a methyl group; $R_3$ represents an alkyl group, which may be substituted; and Ar represents an aryl group, which may be substituted. $R_2$ is preferably a methyl group. $R_3$ is preferably a methyl group, ethyl group, n-propyl group, i-propyl group, n-butyl group, i-butyl group or t-butyl group. Ar is preferably a phenyl group or substituted phenyl group.

In the monomer represented by Formula (K), X represents an anion and preferably $Br^-$, $Cl^-$, $CH_3COO^-$, $NO_3^-$ or $(SO_4^{2-})_{1/2}$. The polymer containing a polymerization unit comprised of the above-described monomer includes not only a polymer consisting of the monomer but also a copolymer or graft polymer containing another vinyl monomer. The proportion which is accounted for by the copolymerizing monomer may be optional, preferably 20 mol % or less and more preferably 10 mol % or less.

The molecular weight of the monomer represented by formulas (K), (L) and (M) is preferably 5,000 to 100,000 and more preferably 10,000 to 30,000. The proportion which is accounted for the monomer represented by formula (K), (L) or (M) is not specifically limitative, preferably 0.1 to 10 mol % and more preferably 1.0 to 5.0 mol %. Exemplary examples of the monomer represented by formula (K), (L) or (M) and the cationic polymer comprised thereof are shown below.

Exemplified Compound

K-1

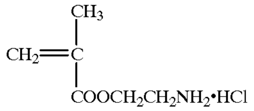

K-2

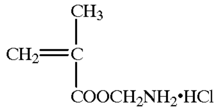

K-3

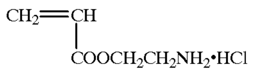

K-4

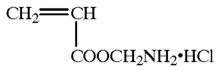

-continued

K-5

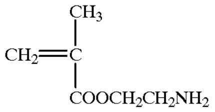

K-6

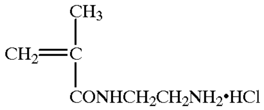

K-7

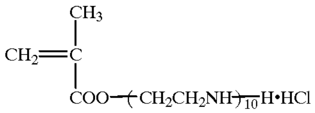

K-8

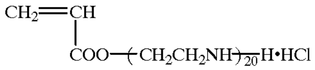

K-9

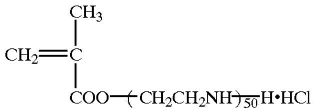

K-10

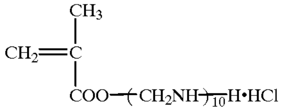

L-1

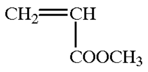

L-2

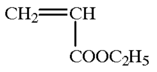

L-3

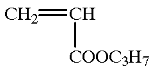

L-4

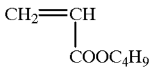

L-5

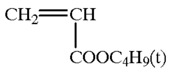

L-6

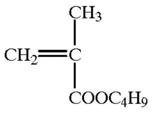

L-7

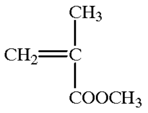

-continued

L-8

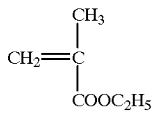

(M-1)

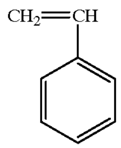

(M-2)

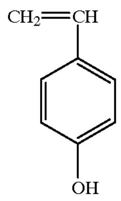

(M-3)

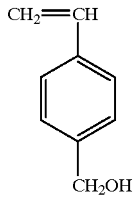

| Polymer | Monomer 1 | Monomer 2 | Monomer 3 | Monomer 4 | Mol. weight |
|---|---|---|---|---|---|
| 1 | K-1(3) | L-4(50) | L-7(40) | M-1(7) | 10000~30000 |
| 2 | K-1(5) | L-4(50) | L-8(40) | M-1(5) | 10000~30000 |
| 3 | K-1(7) | L-4(48) | L-6(40) | M-1(5) | 10000~30000 |
| 4 | K-1(10) | L-1(40) | L-7(40) | M-1(10) | 10000~30000 |
| 5 | K-1(15) | L-1(40) | L-8(30) | M-1(15) | 10000~30000 |
| 6 | K-1(20) | L-1(40) | L-6(30) | M-1(10) | 10000~30000 |
| 7 | K-2(3) | L-4(50) | L-7(40) | M-1(7) | 10000~30000 |
| 8 | K-2(5) | L-4(50) | L-8(40) | M-1(5) | 10000~30000 |
| 9 | K-2(7) | L-4(48) | L-6(40) | M-1(5) | 10000~30000 |
| 10 | K-2(10) | L-1(40) | L-7(40) | M-1(10) | 10000~30000 |
| 11 | K-2(15) | L-1(40) | L-8(30) | M-1(15) | 10000~30000 |
| 12 | K-2(20) | L-1(50) | L-6(30) | M-1(10) | 10000~30000 |
| 13 | K-6(3) | L-4(50) | L-7(40) | M-1(7) | 10000~30000 |
| 14 | K-9(10) | L-1(40) | L-7(40) | M-1(10) | 10000~30000 |
| 15 | K-10(15) | L-1(50) | L-7(30) | M-1(5) | 10000~30000 |
| 16 | K-10(10) | L-4(60) | L-6(20) | M-1(5) | 10000~30000 |

*Values in parentheses are presented in mol %.

These compounds can be synthesized by known methods and commercially available one is, e.g., Polyment NK-100 (trade product by Nihon Shokubai Kagaku).

A weight ratio of the content of gelatin in the ink-receiving layer (denoted as G) to that of the cationic polymer (C) is preferably $$20/80 \leqq G/C \leqq 95/5$$

and more preferably $$40/60 \leqq G/C \leqq 90/10.$$

When the ratio is less than 20/80, ink receptivity of gelatin and glossiness is lowered and when the ratio is more than 95/5, sufficient fastness can not be achieved.

For the purpose of enhancing the ink receptivity and dot reproducibility, it is preferred to employ a nonionic water-soluble polymer in combination with the gelatin and the water-soluble cationic polymer. Examples of preferred non-ionic polymers include polyvinyl alcohols; polyvinyl pyrrolidones, polyvinyl formal such as various modified polyvinyl alcohols and derivatives thereof (JP-A 60-145879, 60-220750, 61-14317761-235182, 61-235183 and 61-261089); polymers containing a acryl group, such as polyamides, polydimethylacrylamides, polydimethylaminoacrylate and acrylic acid vinyl alcohol copolymer salt (JP-A 60-168651 and 62-9988); natural polymers and their derivatives such as starch, oxidized starch, carboxyl starch, dialdehyde starch, cationic starch, dextrin, arabic gum, casein, pullulan, dextran, methylcellulose, ethyl cellulose, carboxymethylcellulose and hydroxypropylcellulose (JP-A 59-174382, 60-262685, 61-143177, 61-181679, 61-193879 and 61-287782); synthetic polymers, such as polyethylene glycols, polypropylene glycols; polyvinyl ethers; polyglycerines, maleic acid alkylvinyl ether copolymers, maleic acid N-vinylpyrrol copolymers, styrene anhydrous maleic acid copolymers, polyethylene imines (JP-A 61-32787, 61-237680, and 61-277483). Of these are specifically preferred polyvinyl pyrrolidones, polyvinyl alcohols and polyethylene glycols. The nonionic water soluble polymer is contained in the ink receiving layer, preferably in an amount of 10 70% by weight and more preferably 20 to 60% by weight.

Preferred ink-jet recording sheet according to the invention ,in terms of water resistance and texture of the resulting image, can be achieved by providing the ink receiving layer on a hydrophobic substrate, such as transparent or opaque film, or resin coated paper, the surface of which has no water absorptivity. any of known substrates in the art can be employed. Examples of the transparent substrate include films or plates of polyester resin, diacetate resin, triacetate resin, acryl resin, polycarbonate resin, polyvinyl chloride resin, polyimide resin, cellophane and celluloid, and a glass plate.

The thickness of the transparent substrate is preferably 10 to 200 μm. Examples of the opaque substrate include synthetic paper, resin coated paper, colorant containing opaque film and foamed film. Of these is preferred polyester resin and resin coated paper similar to a support used in photographic print paper. It is a more preferable embodiment of the invention to provide the ink receiving layer on the surface of these substrates.

The resin coated paper preferably employed in the invention is not specifically limitative. Generally used paper can be employed and smoothed raw paper used for photographic supports is preferred. As pulp constituting the raw paper are employed natural pulp, regenerated pulp and synthetic pulp, singly or in combination thereof. Further, there may be incorporated, in the raw paper, additives generally employed in paper, including a sizing agent, paper-strength enhancing agent, filler, antistatic agent, fluorescent brightener and dye. The sizing agent, strength enhancing agent, fluorescent brightener, antistatic agent and dye may be coated on the surface.

The thickness of the raw paper is not specifically limitative. There is preferred surface-smoothed paper which is prepared by applying compression by a calender during or after paper making. The weight of the raw paper is preferably 30 to 250 g/$m^2$.

As resins used in the resin coated paper are employed a polyolefin resin and electron-beam curable resin. The polyolefin resin includes a low density polyethylene, high density polyethylene, polypropylene, polybutene, and polypentene, their copolymer or mixture thereof, and those which have a variety of densities and melt indexes can be employed singly or in combination thereof.

A variety of additives is incorporated, optimally in combination, in the in the resin of the resin coated paper, including pigments such as titanium oxide, zinc oxide, tark and calcium carbonate; a fatty acid amide such as stearic acid amide or arachidinic acid amide; fatty acid metal salts such as zinc stearate, calcium stearate, aluminum stearate and magnesium stearate; antioxidants such as irganocks 1010 and irganocks 1076; blue pigments and dyes such as cobalt blue, ultramarinececilian blue and phthalocyanine blue; magenta pigments and dyes such as cobalt violet, fastviolet, manganese violet; fluorescent brighteners and UV absorbent.

The resin coated paper used as a support in the invention is prepared by casting melted resin such as polyolefin resins on a running raw, i.e., so-called extrusion coating method and coated on both sides with the resin. In the case of the electron-beam curable resin, the resin is coated by conventionally employed coaters such as a gravure coater and blade coater and then exposed to electron beams to be hardened. Prior to coating, the raw paper is preferably subjected to activation treatment such as corona discharge treatment or flame treatment. The surface of the support on which the ink receiving layer is coated, may be glossy or matted and the glossy surface is preferably employed. The back side may not be necessarily coated with a resin, but it is preferred to coat the resin on the back side for the purpose of preventing curl. The back side is conventionally matte. and the face-side or both face and back sides are subjected to the activation treatment such as corona discharge treatment or flame treatment. The thickness of the resin coating layer is not specifically limitative and generally 5 to 50 $\mu$m.

For the purpose of preventing adhesion defects such as blocking, a matting agent can be incorporated in the face-side layer and/or back-side layer, in an amount of 0.005 to 0.1 g/$m^2$. The matting agent is well known in the photographic art, which is defined as discrete, organic or inorganic material particles dispersible in a hydrophilic organic colloid binder. Examples of inorganic matting agents include oxides (e.g., silicon dioxide, titanium oxide, magnesium oxide, aluminum oxide), alkali earth metal salts (e.g., sulfates or carbonates, such as barium sulfate, calcium carbonate, magnesium sulfate), non-image forming silver halide grains (silver chloride, silver bromide, and a small amount of iodide may be contained) and glass. Furthermore, there can be employed matting agents described in West German patent 2,529,321, British patent 760,775 and 1,260,772; U.S. Pat. Nos. 1,201,905, 2,192,241, 3,053,661, 3,062,649, 3,257,206, 3,322,555, 3,353,958, 3,370,951, 3,411,907, 3,437,484, 3,523,022, 3,615,554, 3,635,714, 3,769,020, 4,021,245, and 4,029,504.

Examples of organic matting agents include starch, cellulose esters (e.g., cellulose acetate propionate), cellulose ethers (e.g., ethyl cellulose) and synthetic resins. The synthetic resins are water insoluble or sparingly soluble synthetic polymers containing, a polymer component, alkyl (metha)acrylate, alkoxyalkyl methacrylate, glycidyl (metha) acrylate, (metha)acrylamide, vinyl ester (e.g., vinyl acetate), acrylonitrile, olefins (e.g., ethylene), styrene, benzoguanamine formaldehyde condensation product singly or in combination with acrylic acid, methacrylic acid, $\alpha$, $\beta$-unsaturated dicarboxylic acid, hydroxyalkyl(metha) acrylate, sulfoalkyl(metha)acrylate or styrenesulfonic acid. In addition, an epoxy resin, nylon, polycarbonate, phenol resin, polyvinyl carbazole and polyvinylidene chloride are also usable. Furthermore, there can be used organic matting agents described in British Patent 1,055,713, U.S. Pat. Nos. 1,933,213, 2,221,873, 2,268,662, 2,322,037, 2,376,005, 2,391,181, 2,701,245, 2,992,101, 3,079,257, 3,262,782, 3,443,946, 3,516,832, 3,539,344, 3,591,379, 3,754,924, and 3,767,448, JP-A 49-106821 and 57-14835.

Of these compounds are preferred polymethyl methacrylate, benzoguanamine formaldehyde condensation product (benzoguanamine resin, concretely, a compound represented by the formula as below, e.g., trade name, Eposter produced by Nihon Shokubai Kagaku: Known Chemical Material 7-31),

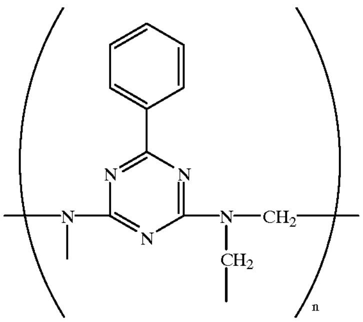

polyolefins (e.g., trade name, Flow-beads LE-1080, CL-2080HE-5023, produced by Seitetsu Kagaku; trade name, Chemi-pearl V-100 produced by Mitsui Sekiyu Kagaku), polystyrene beads (produced by Moritex Co.), nylon beads (produced by Moritex Co.), AS resin beads (produced by Moritex Co.), epoxy resin beads (produced by Moritex Co.) and polycarbonate resin (Moritex Co.).

The matting agent can be employed in combination thereof.

The ink receiving layer can be formed by conventional coating methods such as size-press method, roll coater method, blade coater method, air-knife coater method, gate-roll coater method, rod bar coater method, curtain coating method and extrusion method, in the case when coated on the substrate. The ink receiving layer can be provided within the substrate by incorporating materials constituting the ink receiving layer into pulp slurry to make paper.

A drying method after coating is not specifically limitative, and the cold dry method described in JP-A 6-64306 is preferred to obtain a recording sheet with high quality.

In the invention, in addition to the binder, a surfactant can be incorporated into the ink receiving layer to enhance dot reproducibility. Usable surfactants include any of anionic, cationic, nonionic and betaine type ones, and low and high molecular weight ones can be used. The addition amount of the surfactant is preferably 0.001 to 5 g and more preferably 0.01 to 3 g per 100 g of the binder of the ink receiving layer.

In the invention, it is preferable to incorporate a fluorine-containing surfactant in the ink receiving layer. In the case of two or more ink receiving layers, the surfactant is preferably incorporated in the upper layer. Of the fluorine-containing surfactants are preferred anionic and/or cationic surfactants.

A preferred anionic fluorine-containing surfactant is represented by the following formula (FA):

Formula (FA)(Cf)—(Y)*n* wherein Cf represents a n-valent group having at least three fluorine atoms and at least two carbon atoms; Y represents —COOM, —$SO_3M$, —$OSO_3M$ or —P(=O) $(OM)_2$, in which M is a hydrogen atom, an alkali metal atom or a cation such as quaternary ammonium; and n is 1 or 2.

The fluorine-containing surfactant is more preferably represented by the following formula (FA')

Formula (FA')

Rf—(D)*t*—Y wherein Rf represents a fluorine-substituted alkyl group or aryl group having 3 to 30 carbon atoms; D represents a bivalent group containing at least one linkage group selected from —O—, —COO—, —$CON(R_1)$— and —$SO_2N(R_1)$— and having 1 to 12 carbon atoms; $R_1$ represents an alkyl group having 1 to 5 carbon atoms; t is 1 or 2; and Y represents —COOM, —$SO_3M$, —$OSO_3M$ or —P(=O) $(OM)_2$, in which M is a hydrogen atom, an alkali metal atom or a cation such as quaternary ammonium.

Exemplary examples of the compounds represented by formula (FA) are shown below, but the compounds are not limited to these examples.

FA-1

$C_7F_{15}COONH_4$

FA-2

$C_{10}F_{21}(CH_2)_{10}COOH$

FA-3

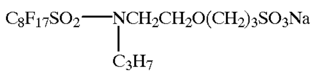

FA-4

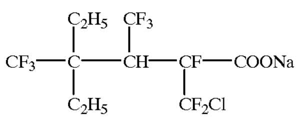

FA-5

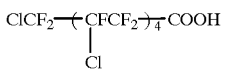

FA-6

$H(CF_2)_{10}COOH$

-continued

FA-7

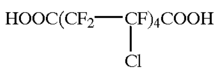

FA-8

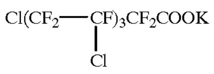

FA-9

$C_5F_{11}CH{=}CH(CH_2)_3COONa$

FA-10

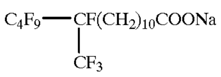

FA-11

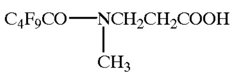

FA-12

$Cl(CF_2)_6COONa$

FA-13

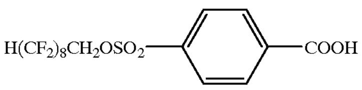

FA-14

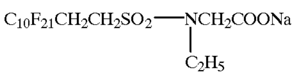

FA-15

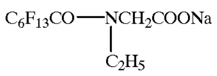

FA-16

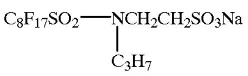

FA-17

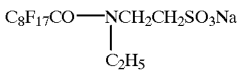

FA-18

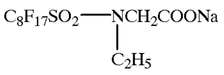

FA-19

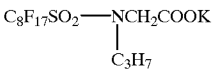

FA-20

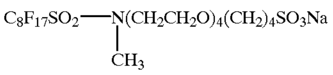

FA-21

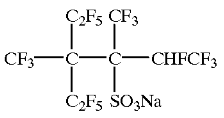

FA-22

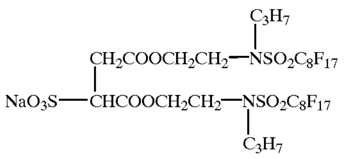

-continued

FA-23

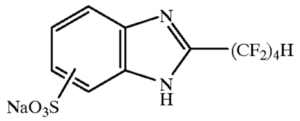

(—SO$_3$Na is located at 4- or 5-position or mixture thereof)

FA-24

$H(CF_2)_6CH_2PO_3H_2$

FA-25

$H(CF_2)_8PO_3Na_2$

FA-26

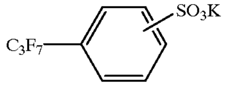

(—SO$_3$Ka is located at o-, m or p-position or mixture thereof)

FA-27

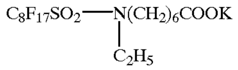

FA-28

$C_{12}F_{25}CH_2OSO_3Na$

FA-29

$C_7F_{15}COO(CH_2)_3SO_3K$

FA-30

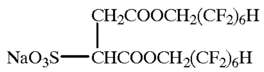

FA-31

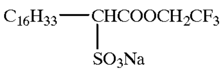

FA-32

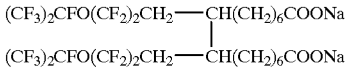

FA-33

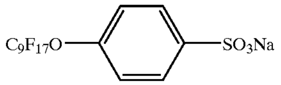

FA-34

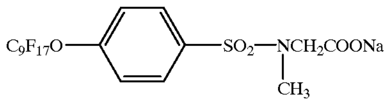

FA-35

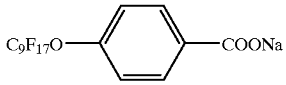

FA-36

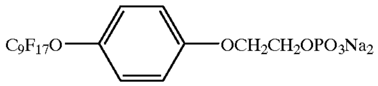

-continued

FA-37

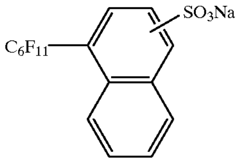

FA-38

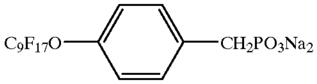

FA-39

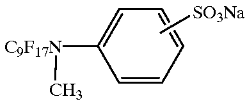

FA-40

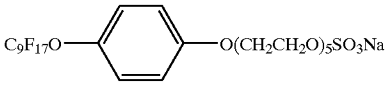

FA-41

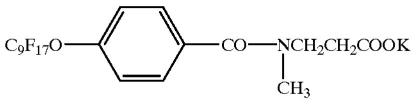

FA-42

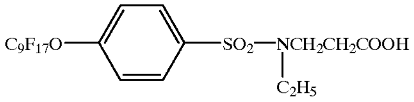

FA-43

$C_9F_{17}OCH_2CH_2OSO_3Na$

FA-44

$C_9F_{17}O(CH_2)_4OPO_3Na_2$

FA-45

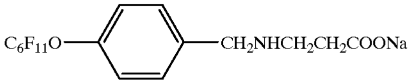

FA-46

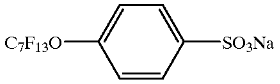

FA-47

$H(CF_2)_7O(CH_2)_3SO_3Na$

FA-48

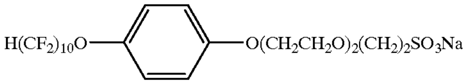

FA-49

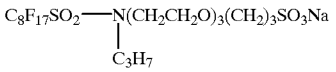

In particular, a fluorine-containing anionic surfactant containing a linkage group of —$SO_2N(R_1)$— is more preferably used.

The fluorine-containing cationic surfactant preferably employed in the invention, is represented by the following formula (FK):

Formula (FK)

$$Rf—L—X^+Z^-$$

wherein Rf' represents a hydrocarbon group having 1 to 20 carbon atoms, in which at least one hydrogen atom is substituted a fluorine atom; L represents a bonding or bivalent group; $X^+$ represents a cation; and $Z^-$ represents a counter anion.

Examples of Rf' include $—C_kF_{k+1}$ (k is 1 to 20, preferably 3 to 12), $—C_mF_{2m}$, and $—C_mF_{2m-1}$ (m is 2 to 20, preferably, 3 to 12).

Examples of L include $—SO_2N(R^1)(CH_2)_p—$, $—CON(R^1)(CH_2)_p—$, $—OASO_2N(R^1)(CH_2)_p—$, $—OACON(R^1)(CH_2)_p—$, $—OAO(CH_2)_p—$, $—OAO(CH_2)_p—$, $—OA(CH_2)_p$, $—O(CH_2CH_2O)_q(CH_2)_p—$, $—O(CH_2)_p—$, $—N(R^1)(CH^2)_p—$, $—SO_2N(R^1)(CH_2)_pO(CH_2)_r—$, $—CON(R^1)(CH_2)_pO(CH_2)_r—$, $—OASO_2N(R^1)(CHR^1)_pOA—$ and $—(CH_2)_p(CHOH)_s(CH_2)_r—$.

Examples of $X^+$ include $—N^+(R^1)_3$, $—N^+(Ch_2CH_2OCH_3)_3$, $—N^+C_4H_8O(R^1)$, $—n^+(R^1)(R^2)(Ch_2CH_2OCH_3)$, $—N^+C_5H_5$, $—N^+(R^1)(R^2)(CH_2)_pC_6H_5$, and $—N_+(R_1)(R_2)(R_3)$, in which $R^1$ and $R^2$ each represents a hydrogen atom or an alkyl group having 1 to 6 carbon atoms, which may be substituted; p, r, s each represent an integer of 0 to 6 and q represents an integer of 1 to 20.

Examples of $Z^-$ include $I^-$, $Cl^-$, $Br^-$, $CH_3SO_3^-$, $CH_3—C_6H_4—SO_3—$.

Exemplary examples of the fluorine-containing cationic surfactant are shown below, but the surfactant is not limited to these examples.

FK-1

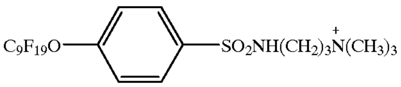

$I^-$

FK-2

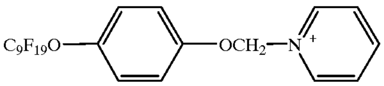

$Cl^-$

FK-3

$C_7F_{15}CONH(CH_2)_2\overset{+}{N}(CH_3)_3$ $Cl^-$

FK-4

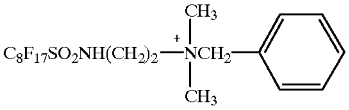

$Cl^-$

FK-5

$C_2F_5CONH(CH_2)_3\overset{+}{N}(CH_3)_3$ $I^-$

FK-6

$C_{12}F_{23}O(CH_2CH_2O)_5CH_2CH_2\overset{+}{N}(CH_3)_3$ $I^-$

FK-7

$C_9F_{17}O(CH_2)_3\overset{+}{N}(CH_3)_3$

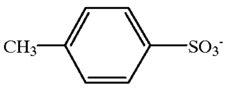

FK-8

$C_8F_{17}SO_2NH(CH_2)_3\overset{+}{N}(CH_3)_3$ $I^-$

FK-9

$C_8F_{17}SO_2NH(CH_2)_3\overset{+}{N}(CH_2CH_2OCH_3)_3$ $I^-$

FK-10

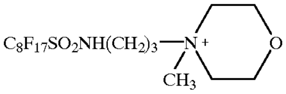

$I^-$

FK-11

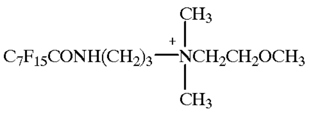

$Br^-$

FK-12

$C_9F_{19}CONH(CH_2)_5\overset{+}{N}(CH_3)_3$ $I^-$

-continued

| | | |
|---|---|---|
| FK-13 | $C_8F_{17}SO_2NH(CH_2)_3OCH_2CH_2\overset{+}{N}(CH_3)_3$ | 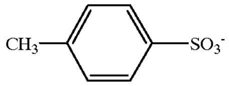 |
| FK-14 | $C_{12}F_{25}CONH(CH_2)_3OCH_2CH_2\overset{+}{N}(CH_3)_3$ | 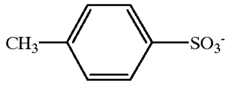 |
| FK-15 | 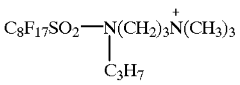 | $I^-$ |
| FK-16 | 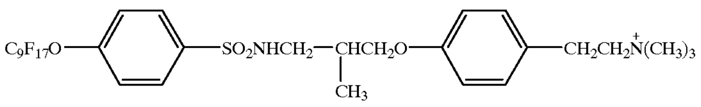 | $I^-$ |
| FK-17 | 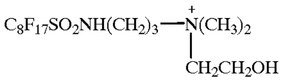 | $Br^-$ |
| FK-18 | 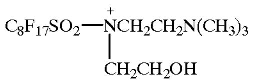 | $Br^-$ |
| FK-19 | $C_8F_{17}SO_2NH(CH_2)_3\overset{+}{N}(CH_3)_3$ | 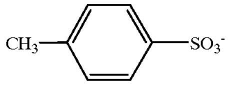 |
| FK-20 | 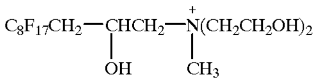 | $Cl^-$ |
| FK-21 | $C_8F_{17}SO_2NH(CH_2)_3\overset{+}{N}(CH_3)_3$ | $Br^-$ |

The fluorine-containing a nionic surfactant or fluorine-containing cationic surfactant can be synthesized according to methods described in U.S. Pat. Nos. 2,559,751, 2,567,011, 2,732,398, 2,764,602, 2,806,866, 2,809,998, 2,915,376, 2,915,528, 2,918,501, 2,934,450, 2,937,098, 2,957,031, 3,472,894 and 3,555,089; British Patent 1,143,927 and 1,130,822; Japanese Patent 45-37304; JP-A 47-9613, 49-134614, 50-117705, 50-117727, 50-121243, 52-41182 and 51-12392; J. Chem. Soc., 1950, page 2789, ibid 1957 page 2574 and 2640; J. Amer. Chem. Soc. 79, 2549 (i957), J. Japan Oil Chemists Soc. 12 653 and J. Org. Chem. 30 3524 (1965).

The fluorine-containing surfactant can be commercially available as Megafac F (trade name) from Dainihon Ink Kagaku Co. ltd.; Fluorad FC (trade name) from Minnesota Mining and Manufacturing Co.; Monflor (trade name) from Imperial Chemical Ind. Co.; Zonyls (trade name) from E. I. du'Pont Numerous and Co.; and Licowet VPF (trade name) from Farberke Hoechst Co.

According the invention, the use of the fluorine-containing anionic surfactant in combination with the fluorine-containing cationic surfactant enhances effects of the invention. In this case, the total using amount of the anionic and cationic surfactants is 0.1 to 1000 mg/m$^2$, preferably 0.5 to 300 mg/m$^2$ and more preferably 1.0 to 150 mg/m$^2$. When both surfactants are used in combination, each may be two or more in combination. Further, the surfactants can be used in combination with a fluorine-containing nonionic surfactant, betaine-type fluorine-containing surfactant or hydrocarbon type surfactant. A molar ratio of the fluorine-containing anionic surfactant to the fluorine-containing cationic surfactant is preferably 1:10 to 10:1 and more preferably 3:7 to 7:3.

The ink receiving layer can be hardened with a hardener to enhance water resistance and dot reproducibility. Examples of the hardener include aldehyde compounds such as formaldehyde and glutar aldehyde; ketone compounds such as diacetyl and chloropentane-dione; compounds containing a reactive halogen such as bis-(2-chloroethylurea)-2-hydroxy-4,6-dichloro-1,3,5-triazine and compounds described in U.S. Pat. No. 3,288,775; reactiveolefinic compounds such as divinyl sulfon and compounds described in U.S. Pat. No. 3,365,718; N-methylol compounds described in U.S. Pat. No. 2,732,316; isocyanates described in U.S. Pat. No. 3,103,437; aziridines described in U.S. Pat. Nos. 2,983,611 and 3,017,280; carbodiimide compounds described in U.S. Pat. No. 3,100,704; epoxy compounds described in U.S. Pat. No. 3,-91,537; halogen carboxyaldehydes such as mucochloric acid; dioxane derivatives such as dihydoxydioxane; and inorganic hardeners such as chrome alum, potassium alum and zirconium sulfate. These hardeners can be used in combination thereof. Of these hardeners are preferred triazine type, divinylsulfone type and epoxy type hardeners. The hardener is added in an amount of 0.01 to 10 g and preferably 0.1 to 5 g per 100 g of gelatin.

In addition to the surfactant and hardener, there are incorporated, in the ink receiving layer, a variety of additives such as an inorganic pigment, coloring dye, coloring pigment, fixing agent of ink dye, UV absorbent, antioxidant, dispersant for pigments. defoaming agent, leveling agent, antiseptic agent, fluorescent brightener, viscosity-adjusting agent and pH-adjusting agent.

Resin coated paper used in the invention is not specifically limitative. Conventionally employed papers are usable and smooth raw paper such as one employed as a photographic support is preferred. As pulp constituting the raw paper, natural pulp, regenerated pulp or synthetic pulp is employed singly or in combination. There are compounded additives conventionally employed in paper making, such as a sizing agent, paper strength-increasing agent, filler, antistatic agent, fluorescent brightener, and dye. Further, a surface sizing agent, paper surface strengthening agent, fluorescent brightener, antistatic agent, dye or anchoring agent is coated on the paper surface.

With regard to the thickness of raw paper, there is specifically no limitation. A paper with superior surface smoothness is preferred, which is subjected to calendering during or after paper making, and the weight thereof is preferably 30 to 250 $g/m^2$.

As a resin used in the resin-coated paper are employed polyolefin resins and electron beam-hardenable resins. Examples of the polyolefin resins include a homopolymer such as low density polyethylene, high density polyethylene, polypropylene, polybutene or polypentene, copolymers such as ethylene-propylene copolymer or a mixture thereof. These polymer with various density or melt-indexes are employed singly or in combination.

The substrate used in the invention may be provided with a back-coating layer for enhancement of antistatic property, transportability and anticurl. There can be incorporated in the back-coating layer, an inorganic antistatic agent, organic antistatic agent, hydrophilic binder, latex, hardener, pigment or surfactant in optimal combination.

The water-based ink is referred to as a recording liquid comprised of coloring agent, liquid medium and other additive(s). examples of the coloring agent include substantive dyes, acidic dyes, basic dyes, reactive dyes and dyes for use in food.

Examples of the medium used in the water-based ink include water and a variety of water soluble organic solvents, alkyl alcohols with 1 to 4 carbon atoms such as methyl alcohol, ethyl, n-propyl alcohol, isopropyl alcohol, n-butylalcohol, sec-butyl alcohol, tert-butyl alcohol, and isobutyl alcohol; amides such as dimethylformamide, and dimethylformamide; ketones or ketone alcohols such as acetone and diacetone alcohol; ethers such as tetrahydrofuran and dioxane; polyalkylene glycols such as polyethylene glycol and polypropylene glycol; alkylene glycols with 2 to 6 carbon atoms such as ethylene glycol, propylene glycol, butylene glycol, triethylene glycol, 1,2,6-hexanetriol, thiodiglycol, hexylene glycol and diethylene glycol; lower alkyl ethers of a polyvalent alcohol such as glycerin, ethylene glycol methyl ether, diethylene glycol methyl(ethyl) ether and triethylene glycol monoethyl ether; pyrrolidinones such as 2H pyrrolidinone; and pyrrolidones such as 1-methyl-2-pyrrolidone and 2-pyrrolidone. Of these water soluble organic solvents are preferred polyvalent alcohols such as diethylene glycol, lower alkyl ethers of a polyvalent alcohol such as triethylene glycol monomethyl ether and triethylene glycol monoethyl ether, and pyrrolidones.

The solvent for ink used in the invention is preferably employed in the form of a mixture of water and the above-described organic solvent in terms of preventing clogging of an ink-head nozzle. In this case, a mixing ratio of water to the organic solvent is preferably 30/70 to 70.30 and more preferably 40/60 to 60/40.

There may be incorporated other additives such as a pH-adjusting agent, metal ion sequestering agent, fungicide, viscosity-adjusting agent, surface tension-adjusting agent, wetting agent, surfactant and antiseptic.

EXAMPLES

The present invention will be explained based on examples, but the invention is not limited to thereto.

Example 1

On a commercially available polyethylene-coated paper support which is comprised of a polyethylene layer of 20 $g/m^2$ (low density polyethylene of 70 parts, high density polyethylene of 20 parts and titanium oxide of 10 parts) coated on the surface of a raw paper of 100 $g/m^2$ and a polyethylene layer of 25 $g/m^2$ (low density polyethylene of 50 parts and high density polyethylene of 50 parts) coated on the back side, a coating solution was coated by the bar coating method so that a dry thickness was ca. 10 $\mu$m to prepare an ink-jet recording sheet having the following composition.

| | |
|---|---|
| Gelatin having an isoelectric point as shown in Table | 15.0 $g/m^2$ |
| Water soluble cationic polymer as shown in Table 1 | |

Using an ink-jet printer (MJ-5000C produced by Seiko-Epson), the thus prepared ink-jet recording sheets were printed with each of yellow (Y), magenta (M), cyan (C), blue (B), green (G), red (R) and black (Bk) colors, and evaluated according to the following items.

Water Resistance:

A red color-printed portion was immersed in water at 20° C. for 5 min and then allowed to naturally dry at room temperature for 3 min. Any remaining water on the surface was wiped with linen cloth and the resulting image condition was visually evaluated based on the following criteria.

A: All printed portions remained.

B: Some printed portions were slightly transferred to the linen and lost, but at a level of no practical problem in use.

C: Small printed portions were lost, but at a level of no practical problem in use.

D: Printed portions were lost, and at a level of no practical value.

Glossiness:

Using a gloss-meter type VG-1D (produced by Nihon Denshoku Kogyo), glossiness of the surface of a non-printed portion (at 60 degrees) was measured and evaluated based on the following criteria.

A: A reading of 80 or more, with excellent glossiness.

B: A reading of 70 to 80, with good glossiness.

C: A reading of 50 to 70, glossy but at the lowest limit acceptable for use.

D: less than 50, non-glossy and unacceptable for use.

TABLE 1

| Sample No. | Isoelectric point | Cationic Polymer | Ratio of gelatin/polymer (wt/wt) | Water resistance | Glossiness | Remark |
|---|---|---|---|---|---|---|
| 1-1 | 5.4 | — | 100/0 | D | B | Comp. |
| 2 | 5.4 | PAA-Hcl | 70/30 | D | D | Comp. |
| 3 | 5.5 | PAA-Hcl | 70/30 | C | B | Inv. |
| 4 | 7.8 | PAA-Hcl | 70/30 | C–B | B | Inv. |
| 5 | 8.1 | PAA-Hcl | 70/30 | B | A | Inv. |
| 6 | 9.4 | PAA-Hcl | 70/30 | B | A | Inv. |
| 7 | 9.6 | PAA-Hcl | 70/30 | B | B | Inv. |
| 8 | 8.7 | PAS-H | 70/30 | B | A | Inv. |
| 9 | 8.7 | POLYFIX 250WS | 70/30 | B | A | Inv. |
| 10 | 8.7 | GOSENOL CM-318 | 70/30 | A | B | Inv. |
| 11 | 8.7 | GAFQUAT · HS-100 | 70/30 | A | B | Inv. |
| 12 | 8.7 | POLYMENT NK-100 | 70/30 | A | A | Inv. |
| 13 | 8.7 | POLYMENT NK-100 | 90/10 | B | A | Inv. |
| 14 | 8.7 | POLYMENT NK-100 | 80/20 | B | A | Inv. |
| 15 | 8.7 | POLYMENT NK-100 | 70/30 | A | A | Inv. |
| 16 | 8.7 | POLYMENT NK-100 | 60/40 | A | A | Inv. |
| 17 | 8.7 | POLYMENT NK-100 | 50/50 | B | B | Inv. |
| 18 | 8.7 | POLYMENT NK-100 | 40/60 | B | B | Inv. |
| 19 | 8.7 | POLYMENT NK-100 | 30/70 | C | B | Inv. |
| 20 | 8.7 | POLYMENT NK-100 | 20/80 | C | B | Inv. |
| 21 | 8.7 | POLYMENT NK-100 | 95/5 | C | A | Inv. |
| 22 | 8.7 | — | 100/0 | D | A | Comp. |

PAA-HCl: Polyallylamine hydrochloride (a produced by Nittobo)
PSA-H: Polydimethylallyl ammonium chloride (produced by Nittobo)
POLYFIX 250WS: Polyamide-epichlorohydrin resin (produced by Showa Kobunshi)
GOSENOL CM318 : Cationic modified polyvinyl alcohol (produced by Nihon Goseikagaku)
GAFQUAT HS-100: Cationic modified polyvinyl pyrrolidone (produced by ISP)
POLYMENT NK-100: Cationic polymer (polymer containing polymerization unit represented by formula (K), produced by Nihon Shokubai Kagaku)

As can be seen from Table 1, it is shown that by the use of a gelatin with an isoelectric point of not less than 5.5, in combination with a water soluble cationic polymer in the ink receiving layer, resistance to water of the ink receiving layer was enhanced, leading to improvements in practical water resistance, and in addition, glossiness of the printed surface was enhanced, whereby an ink-jet recording sheet of high quality was obtained. Further, by using the gelatin with the iosoelectric point of 8.0 to 9.5 and when a ratio of gelatin to the cationic polymer is between 90:10 and 60:40, better results still were obtained. It is further shown that polymers containing the polymerization unit represented by formula (K) were superior in compatibility with gelatin.

Example 2

Ink-jet recording sheet samples were prepared in a manner similar to Sample 15 of Example 1, provided that components of the ink receiving layer were varied as shown in Table 2 and in addition to evaluation of example 1, further evaluated with respect to image quality.

Image Quality Evaluation:

Green color printed portions were visually evaluated with respect to image uniformity, based on the following criteria.

A: Slight mottled unevenness and superior uniformity.

B: Unmarked unevenness and good uniformity.

C: Slightly marked unevenness but at an acceptable level for use.

D: Marked unevenness

Glossiness of Printed Portion:

Using a gloss-meter type VG-1D (produced by Nihon Denshoku Kogyo), glossiness of the surface of a black color-printed portion (at 60 degrees) was measured and evaluated based on the following criteria.

A: A reading of 80 or more, with excellent glossiness.

B: A reading of 70 to 80, with good glossiness.

C: A reading of 50 to 70, glossy but at the lowest limit acceptable for use.

D: less than 50, non-glossy and unacceptable for use.

TABLE 2

| Sample No. | Nonionic water soluble polymer | Ratio by weight* | Surfactant ($g/m^2$) | Image uniformity | Water resistance | Glossiness |
|---|---|---|---|---|---|---|
| 1 | — | 70/30/0 | — | C | A | B |
| 2 | PVP-K90 | 70/20/10 | — | B | A | B |
| 3 | PVP-K90 | 70/10/20 | — | B | A | A |
| 4 | PVP-K90 | 70/5/25 | — | B | A | A |
| 5 | PVP-K90 | 60/20/20 | — | B | A | A |
| 6 | PVP-K90 | 60/10/30 | — | B | A | A |
| | PVP-K90 | | | | | |

TABLE 2-continued

| Sample No. | Nonionic water soluble polymer | Ratio by weight* | Surfactant ($g/m^2$) | Image uniformity | Water resistance | Glossiness |
|---|---|---|---|---|---|---|
| 7 | PVP-K90 | 50/10/40 | — | B | A | A |
| 8 | PVP-K90 | 30/10/60 | — | B | A | A |
| 9 | PVP-K90 | 20/10/70 | — | B | A | A |
| 10 | | 10/10/80 | — | B | B | A |
| 11 | PEG20,000 | 50/10/40 | — | B | B | B |
| 12 | PEG150,000 | 50/10/40 | — | B | A | B |
| 13 | PVA GL05 | 50/10/40 | — | B | A | B |
| 14 | PEG150,000 + PVP-K90 | 60/10/10/20 | 0.1 | B | A | A |
| 15 | PEG150,000 + PVP-K90 | 60/10/10/20 | 0.5 | B | A | A |
| 16 | PEG150,000 + PVP-K90 | 60/10/10/20 | 1.0 | B–A | A | A |
| 17 | PEG150,000 + PVP-K90 | 60/10/10/20 | 5.0 | A | A | A |
| 18 | PEG150,000 + PVP-K90 | 60/10/10/20 | 10.0 | A | A | A |
| 19 | PEG150,000 + PVP-K90 | 60/10/10/20 | 20.0 | A | A | A |
| 20 | PEG150,000 + PVP-K90 | 60/10/10/20 | 50.0 | A | A | A |
| 21 | PEG150,000 + PVP-K90 | 60/10/10/20 | 100.0 | A | A | B |
| 22 | PEG150,000 + PVP-K90 | 60/10/10/20 | 150.0 | A | A | B |

*Ratio by weight of gelatin/cationic polymer/nonionic polymer or gelatin/cationic polymer/nonionic polymer (PEG150,000)/nononic polymer (PVP-K90)
PVP-K90: Polyyinyl pyrrolidone (product of BASF)
PEG 20,000: Polyethylene glycol (product of Sanyo Kasei)
PEG 150,000: Polyethylene glycol (product of Meisei Kagakukogyo)
PVA GL05: Polyvinyl alcohol (product by Nihon Goseikagaku)

As can be seen from Table 2, it is proved that, in the invention, the use of a water soluble nonionic polymer or a fluorine-containing surfactant in combination led to improvement in print quality, without lowering water resistance.

Example 3

Ink-jet recording sheet samples were prepared in the same manner as Sample 12 of Example 2, except that a hardener (Compound A or B) further incorporated as shown in Table 3, and evaluated with respect to water resistance and glossiness of printed portions in the same manner as in Example 2, except that printed samples immersed in water were allowed to naturally dry at room temperature for 1 min.

TABLE 3

| Sample No. | Hardener (wt. % based on gelatin) | Water resistance | Glossiness |
|---|---|---|---|
| 1 | — | C | B |
| 2 | A (0.1) | B | B |
| 3 | B (0.01) | B | B |
| 4 | B (0.05) | B | A |
| 5 | B (0.09) | B | A |
| 6 | B (0.10) | B | A |
| 7 | B (0.20) | A | A |
| 8 | B (0.80) | A | A |
| 9 | B (0.90) | A | A |
| 10 | B (1.0) | A | B |
| 11 | B (2.0) | A | B |
| 12 | B (5.0) | A | B |
| 13 | B (10.0) | A | B |

TABLE 3-continued

| Sample No. | Hardener (wt. % based on gelatin) | Water resistance | Glossiness |
|---|---|---|---|

A: $[(CH_2—CHSO_2CH_2)_3—CCH_2SO_2CH_2CH_2]_2—NCH_2CH_2SO_3K$

B: 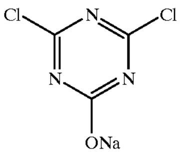

As can be seen from Table 3, addition of the hardener in an optimal amount to the gelatin and water soluble cationic polymer according to the invention led to further enhanced effects of the invention.

Example 4

Ink-jet recording sheet samples were prepared in the same manner as in Example 1, except that the substrate onto which the ink receiving layer was coated was replaced by a white-colored polyethylene terephthalate film with a thickness of 100 $\mu$m. Consequently, evaluation results similar to Example 3 were obtained.

What is claimed is:

1. An ink-jet recording sheet comprising a support having on at least one side thereof at least one ink receiving layer, wherein said ink receiving layer comprises a gelatin having an isoelectric point of 5.5 to 9.6 and a water-soluble cationic polymer containing a polymerization unit comprised of a monomer represented by the following Formula (K):

Formula K (HX)

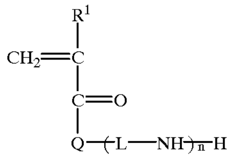

wherein $R^1$ represents a hydrogen atom or a methyl group; Q represents an oxygen atom or —NH—; L represents a bivalent organic linking group; $X^-$ represents an anion; and n is 1 to 100.

2. The ink-jet recording sheet of claim 1, wherein the isoelectric point of said gelatin is 8.0 to 9.5.

3. The ink-jet recording sheet of claim 1, wherein a ratio of a content by weight of said gelatin (G) to that of the water-soluble cationic polymer (C) meets the following requirement:

$$20/80 \leqq G/C \leqq 95/5.$$

4. The ink-jet recording sheet described of claim 3, wherein the ratio meets the following requirement:

$$40/60 \leqq G/C \leqq 90/10.$$

5. The ink-jet recording sheet of claim 1, wherein said ink receiving layer further comprises an aqueous-soluble polymer.

6. The ink-jet recording sheet of claim 5, wherein said aqueous-soluble polymer is selected from the group consisting of a polyvinyl pyrrolidone, a polyvinyl alcohol and polyethylene glycol.

7. The ink-jet recording sheet described of claim 5, wherein said aqueous-soluble polymer is contained in an amount of 10 to 70% by weight of the ink receptive layer.

8. The ink-jet recording sheet of claim 7, wherein said aqueous-soluble polymer is contained in an amount of 20 to 60% by weight of the ink receptive layer.

9. The ink-jet recording sheet of claim 1, wherein said support is a hydrophobic substrate.

10. The ink-jet recording sheet of claim 9, wherein said hydrophobic substrate is a resin coated paper.

11. The ink-jet recording sheet of claim 10, wherein said resin coated paper is a polyolefin coated paper.

12. The ink-jet recording sheet of claim 11, wherein said polyolefin coated paper is a polyethylene coated paper.

13. The ink-jet recording sheet of claim 9, wherein said hydrophobic substrate is a polyester resin film.

14. The ink-jet recording sheet of claim 13, wherein said polyester resin film is a polyethylene terephthalate film.

15. The ink-jet recording sheet of claim 1 wherein said water-soluble cationic polymer is selected from the group consisting of a polymer containing a polymerization unit comprised of a monomer represented by formula (K), a polyallylamine, a dicyandiamide condensate, a cation modified PVP and an epichlorohydrin derivative.

* * * * *